(12) United States Patent
Bond

(10) Patent No.: US 6,738,736 B1
(45) Date of Patent: May 18, 2004

(54) METHOD AND ESTIMATOR FOR PROVIDING CAPACACITY MODELING AND PLANNING

(75) Inventor: William C. Bond, Kildeer, IL (US)

(73) Assignee: Accenture LLP, Palo Alto, CA (US)

( * ) Notice: Subject to any disclaimer, the term of this patent is extended or adjusted under 35 U.S.C. 154(b) by 697 days.

(21) Appl. No.: 09/684,154

(22) Filed: Oct. 6, 2000

Related U.S. Application Data
(60) Provisional application No. 60/158,259, filed on Oct. 6, 1999.

(51) Int. Cl.[7] .................................................. G06F 7/60
(52) U.S. Cl. ............................... 703/2; 700/100; 709/4
(58) Field of Search ............................. 703/2; 709/226, 709/102, 104, FOR 163; 700/100, 106; 702/182

(56) References Cited

U.S. PATENT DOCUMENTS

| | | | |
|---|---|---|---|
| 5,630,069 A | | 5/1997 | Flores et al. ................. 395/207 |
| 5,953,707 A | | 9/1999 | Huang et al. .................. 705/10 |
| 6,313,752 B1 | * | 11/2001 | Corrigan et al. ............ 340/657 |
| 6,336,138 B1 | * | 1/2002 | Caswell et al. ............. 709/226 |
| 6,415,196 B1 | * | 7/2002 | Crampton et al. .......... 700/100 |
| 6,542,854 B2 | * | 4/2003 | Yang et al. .................. 702/182 |

OTHER PUBLICATIONS

Ryan, et al., "Netcentric Computing," Auerbach, 1998.
Ryan, et al., "Practical Guide to Client Server Computing," Auerbach, 2[d.] Ed., 1998.
Cassidy, Anita, *A Practical Guide to Information Systems Strategic Planning*, St. Lucie Press, chap. 5 (1998).
Davis, William S., *The Information System Consultant's Handbook, Systems Analysis and Design*, CRC Press, chaps. 1, 8 (1999).
Kerzner, Ph.D., Harold, *Project Management: A Systems Approach to Planning, Scheduling, and Controlling*, 5th Edition (1995).
Martin, Merle P., *Analysis and Design of Business Information Systems*, Prentice–Hall, 2d. Edition, chap. 3 (1995).
Österle, Hubert, et al., *Total Information System Management*, John Wiley & Sons, chaps. 1, 2 (1993).
Ward, John, et al., *Strategic Planning for Information Systems*, John Wiley & Sons (1996).
Written Opinion, dated Sep. 6, 2001, for corresponding international application PCT/US00/27795.

* cited by examiner

*Primary Examiner*—Albert W. Paladini
(74) *Attorney, Agent, or Firm*—Brinks Hofer Gilson & Lione

(57) ABSTRACT

A method for providing an estimate for building a capacity modeling and planning function in an information technology organization includes conducting the tasks involved in building the capacity modeling and planning function. The tasks include the planning, analyzing, designing, building, testing, and deploying the capacity modeling and planning function. Each task includes process, organization, and technology infrastructure elements.

12 Claims, 9 Drawing Sheets

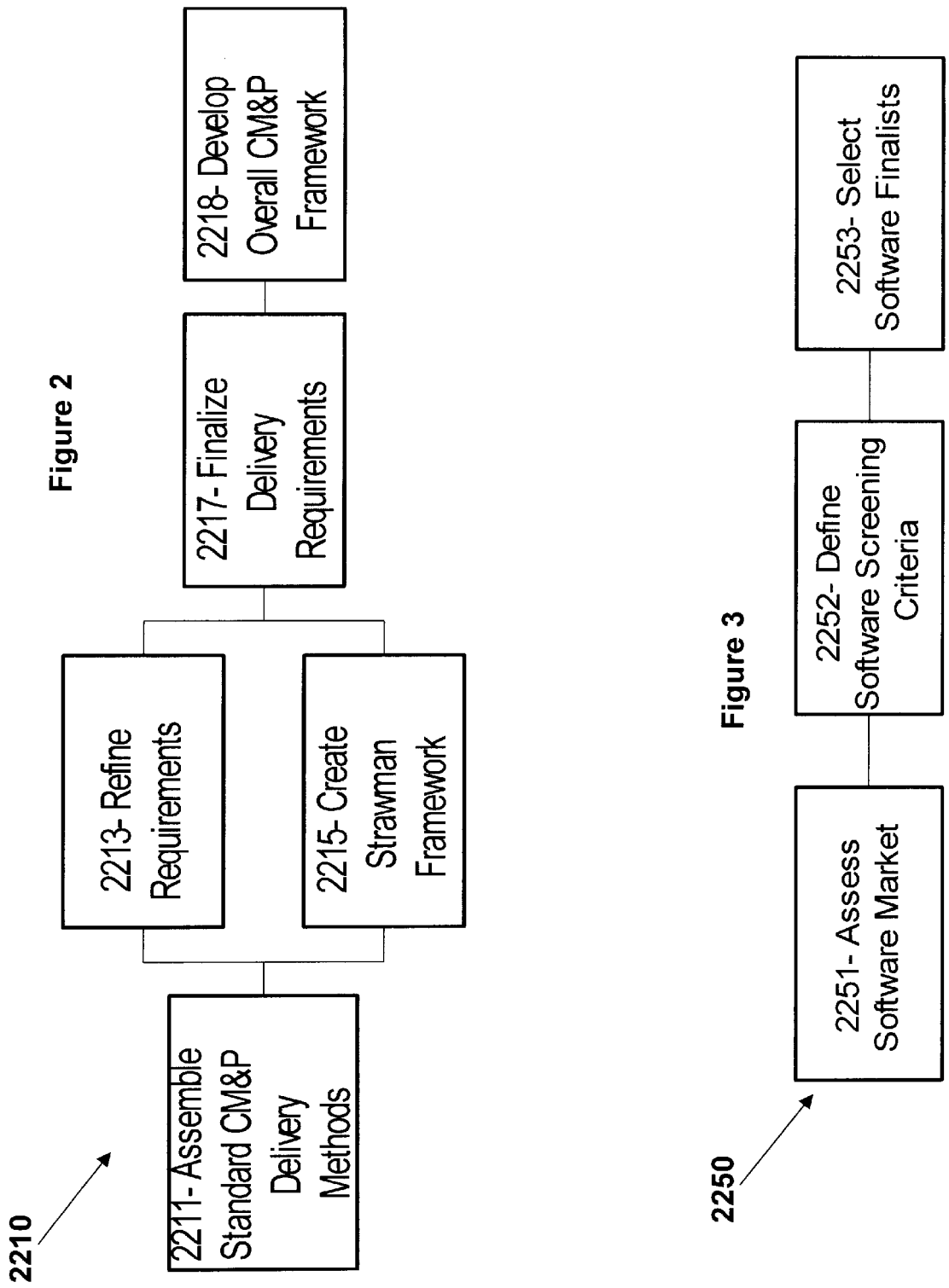

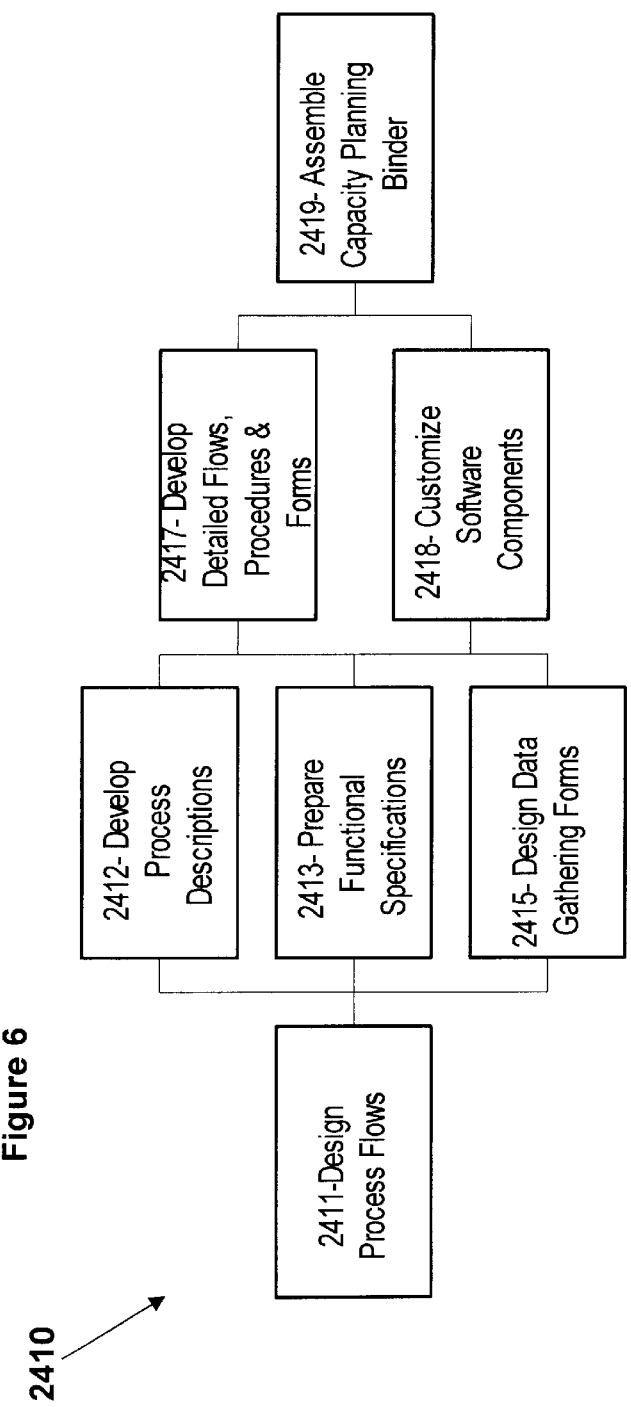
Figure 6
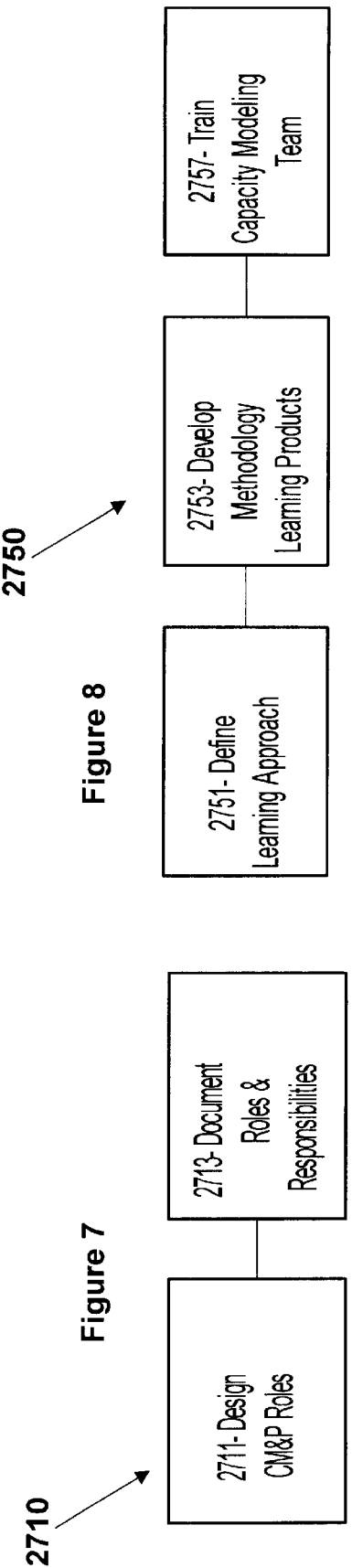
Figure 8
Figure 7

FIG. 13a

| Sponsoring Organization | | | | | | Estimating Worksheet | | | | | | |
|---|---|---|---|---|---|---|---|---|---|---|---|---|
| OM Capacity Modeling & Planning Estimating Guide | | | | | | | | | | | | Staffing Total |

| | | | | | | | | | | | | | 16.67 |
|---|---|---|---|---|---|---|---|---|---|---|---|---|---|
| | 920 | Plan Project Execution | | | | | | | | | | | 6.00 |
| | | 921 | Develop Detailed Work Plan & Estimates | Task Dependent | | 2.501 | 3.051 | 3.752 | M | 3.00 | 3.0 | 0.10 | 0.80 | 0.30 | 1.0 |
| | | 923 | Establish Project Risk Mitigation Plan | Task Dependent | | 0.208 | 0.250 | 0.313 | M | 0.25 | 0.3 | 0.10 | 0.80 | 0.30 | 1.0 |
| | | 924 | Plan Project Quality Activities | Task Dependent | 1 | 0.208 | 0.250 | 0.313 | M | 0.25 | 0.3 | 0.10 | 0.80 | 0.30 | 1.0 |
| | | 925 | Refine Resource Needs | Task Dependent | | 0.834 | 1.000 | 1.251 | M | 1.00 | 1.0 | 0.10 | 0.50 | 0.30 | 1.0 |
| | | 926 | Complete Project Plan | Task Dependent | 1 | 0.417 | 0.500 | 0.626 | M | 0.50 | 0.5 | 0.10 | 0.50 | 0.30 | 1.0 |
| | 940 | Organize Project Resources | | | | | | | | | | | 2.50 |
| | | 941 | Establish Project Standards & Procedures | Task Dependent | | 0.208 | 0.250 | 0.313 | M | 0.25 | 0.25 | 0.10 | 0.50 | 0.30 | 1.0 |
| | | 943 | Organize Project Team | Task Dependent | 1 | 0.521 | 0.625 | 0.782 | M | 0.63 | 0.63 | 0.10 | 0.50 | 0.30 | 1.0 |
| | | 944 | Establish Other Resources | Task Dependent | 1 | 0.521 | 0.625 | 0.782 | M | 0.63 | 0.63 | 0.10 | 0.50 | 0.30 | 1.0 |
| | | 946 | Assign Resources to Work Packages | Task Dependent | 1 | 0.417 | 0.500 | 0.626 | M | 0.50 | 0.50 | 0.10 | 0.50 | 0.30 | 1.0 |
| | | 948 | Enable Resources | Task Dependent | 1 | 0.417 | 0.500 | 0.626 | M | 0.50 | 0.50 | 0.10 | 0.50 | 0.30 | 1.0 |
| | 960 | Control Project Work | | | | | | | | | | | 8.34 |
| | | 961 | Release Work Packages | Task Dependent | 1 | 0.347 | 0.417 | 0.521 | M | 0.42 | 0.42 | 0.10 | 0.50 | 0.30 | 1.0 |
| | | 963 | Measure Performance | Task Dependent | | 0.695 | 0.834 | 1.042 | M | 0.83 | 0.83 | 0.10 | 0.50 | 0.30 | 1.0 |
| | | 965 | Manage Performance | Task Dependent | | 3.474 | 4.169 | 5.211 | M | 4.17 | 4.17 | 0.10 | 0.50 | 0.30 | 1.0 |
| | | 967 | Communicate Project Status | Task Dependent | | 1.390 | 1.667 | 2.084 | M | 1.67 | 1.67 | 0.10 | 0.50 | 0.30 | 1.0 |
| | | 969 | Obtain Acceptance of Interim Deliverables | Task Dependent | | 1.042 | 1.251 | 1.563 | M | 1.25 | 1.25 | 0.10 | 0.50 | 0.30 | 1.0 |
| | 980 | Complete Project | | | | | | | | | | | |
| | | | Obtain Formal Acceptance of Deliverables, Transfer Responsibility, Finalize Documentation, Evaluate Project, Release Resources | Task Dependent | 1 | 0.695 | 0.834 | 1.042 | M | 0.83 | 0.83 | 0.10 | 0.50 | 0.30 | 1.0 |

| | | | | | | | | | | | | | 10.00 |
|---|---|---|---|---|---|---|---|---|---|---|---|---|---|
| | 2210 | Select Delivery Options | | | | | | | | | | | 10.00 |
| | | 2111 | Assemble Standard CM&P Delivery Methods | Methods Fitness | 1 | 1.000 | 1.000 | 2.000 | M | 1.00 | 1.00 | | 0.50 | 0.50 | 1.0 |
| | | 2113 | Refine Requirements | Methods Fitness | 1 | 1.000 | 2.000 | 3.000 | M | 2.00 | 2.00 | | 0.50 | 0.50 | 1.0 |
| | | 2115 | Create Showcase Framework | Methods Fitness | 1 | 2.000 | 3.000 | 4.000 | M | 3.00 | 3.00 | | 0.50 | 0.50 | 1.0 |
| | | 2117 | Finalize Delivery Requirements | Methods Fitness | 1 | 1.000 | 2.000 | 3.000 | M | 2.00 | 2.00 | | 0.50 | 0.50 | 1.0 |
| | | 2119 | Finalize Overall Capacity Management Framework | Methods Fitness | 1 | 2.000 | 2.000 | 3.000 | M | 2.00 | 2.00 | | 0.50 | 0.50 | 1.0 |
| | 2250 | Survey Packaged Software Candidates | | | | | | | | | | | 5.00 |
| | | 2251 | Assess Software Market | Software Selection | 1 | 1.000 | 1.000 | 1.000 | C | 1.00 | 1.00 | | 0.50 | 0.50 | 1.0 |
| | | 2252 | Define Software Screening Criteria | Software Selection | 1 | 1.000 | 1.500 | 2.000 | C | 2.00 | 2.00 | | 0.50 | 0.50 | 1.0 |
| | | 2253 | Select Software Finalists | Software Selection | 1 | 1.000 | 1.000 | 2.000 | C | 2.00 | 2.00 | | 0.50 | 0.50 | 1.0 |
| | 2270 | Develop CM&P Request For Proposal | | | | | | | | | | | 9.00 |
| | | 2271 | Finalize Software Selection Criteria | Software Selection | 1 | 1.000 | 1.000 | 2.000 | C | 2.00 | 2.00 | | 0.50 | 0.50 | 1.0 |
| | | 2272 | Develop Business Scenarios | Software Selection | 1 | 1.000 | 2.000 | 3.000 | C | 3.00 | 3.00 | | 0.50 | 0.50 | 1.0 |
| | | 2273 | Prepare & Distribute Request for Proposal | Software Selection | 1 | 2.000 | 3.000 | 4.000 | C | 4.00 | 4.00 | | 0.50 | 0.50 | 1.0 |
| | 2280 | Select Packaged Software | | | | | | | | | | | 26.75 |
| | | 2281 | Evaluate RFP Responses | Software Selection | 1 | 1.000 | 2.000 | 3.000 | C | 3.00 | 3.00 | | 0.50 | 0.50 | 1.5 |
| | | 2282 | Conduct Vendor Demonstrations | Software Selection | 1 | 1.500 | 2.000 | 5.000 | C | 3.00 | 3.00 | | 0.50 | 0.50 | 1.5 |
| | | 2283 | Select Finalist and Negotiate | Software Selection | 1 | 1.000 | 1.000 | 2.000 | C | 2.00 | 2.00 | | 0.50 | 0.50 | 1.0 |
| | | 2284 | Confirm Costs & Benefits | Software Selection | 1 | 0.500 | 0.500 | 9.500 | C | 0.50 | 0.50 | | 0.50 | 0.50 | 1.5 |
| | | 2285 | Finalize Packaged Software Selection | Software Selection | 1 | 1.000 | 1.000 | 1.000 | C | 1.00 | 1.00 | | 0.50 | 0.50 | 1.0 |
| | | 2286 | Obtain & Install Software | Software Selection | 1 | 1.000 | 2.000 | 4.000 | C | 4.00 | 4.00 | | 0.50 | 0.50 | 1.0 |
| | | 2287 | Document Resource Utilization Measurement Requirem | Methods Fitness | 1 | 1.000 | 2.000 | 3.000 | M | 2.00 | 2.00 | | 0.50 | 0.50 | 1.0 |
| | | 2288 | Install & Adjust Measurement Tools | Multiple Factors | | | | | | 4.25 | 4.25 | | 0.50 | 0.50 | 1.0 |
| | | | | Metrics Servers | 1 | 0.250 | 0.500 | 0.750 | S | | | | | | |
| | | | | Methods Fitness | 1 | 2.000 | 4.000 | 6.000 | M | | | | | | |
| | | 2289 | Arrange & Attend Software Training | Multiple Factors | | | | | | 7.00 | 7.00 | | 0.50 | 0.50 | 1.0 |

FIG. 13b

| Sponsoring Organization | | | | | Estimating Worksheet | | | | | | | | |
|---|---|---|---|---|---|---|---|---|---|---|---|---|---|
| CM Capacity Modeling & Planning Estimating Guide | | | | | | | | | | | | | Staffing Total |
| | | | | Other Training Day | 1.000 | 1.833 | 1.000 | M | | | | | |
| | | | | New Team Member | 3.000 | 3.000 | 3.000 | M | | | | | |
| | | | | | | | | | | | | | 22.25 |
| | 2410 | Develop Modeling Methodology | | | | | | | | | | | 18.00 |
| | | 2411 | Design Process Flows | Methods Fitness | 1 | 1.000 | 2.000 | 3.000 | M | 2.00 | 3.00 | 0.20 | 0.40 | 0.40 | 1.0 |
| | | 2412 | Develop Process Descriptions | Methods Fitness | 1 | 1.000 | 2.000 | 3.000 | M | 2.00 | 3.00 | 0.20 | 0.40 | 0.40 | 1.0 |
| | | 2413 | Prepare Functions Specifications | Methods Fitness | 1 | 1.000 | 2.000 | 3.000 | M | 2.00 | 3.00 | 0.20 | 0.40 | 0.40 | 1.0 |
| | | 2415 | Design Data Gathering Forms | Methods Fitness | 1 | 1.000 | 2.000 | 3.000 | M | 2.00 | 3.00 | 0.20 | 0.40 | 0.40 | 1.0 |
| | | 2417 | Develop Detailed Flows, Procedures & Forms | Methods Fitness | 1 | 5.000 | 8.000 | 12.000 | M | 8.00 | 8.00 | 0.20 | 0.40 | 0.40 | 1.0 |
| | | 2418 | Customize Software Components | Methods Fitness | 1 | 5.000 | 10.000 | 20.000 | M | 10.00 | 15.00 | 0.20 | 0.40 | 0.40 | 1.0 |
| | | 2419 | Assemble Capacity Planning Binder | Methods Fitness | 1 | 2.000 | 2.000 | 4.000 | M | 2.00 | 3.00 | 0.20 | 0.40 | 0.40 | 1.0 |
| | 2710 | Design Organization | | | | | | | | | | | | 0.00 |
| | | 2711 | Design CM&P Roles | CM&P Roles | 0 | 1.000 | 1.000 | 2.000 | S | 0.00 | 0.00 | 0.20 | 0.40 | 0.40 | 1.0 |
| | | 2713 | Document Roles & Responsibilities | CM&P Roles | 0 | 1.000 | 1.000 | 2.000 | S | 0.00 | 0.00 | 0.20 | 0.40 | 0.40 | 1.0 |
| | 2752 | Design Performance Enhancement | | | | | | | | | | | | 4.25 |
| | | 2751 | Define Learning Approach | Methods Fitness | 1 | 0.250 | 0.250 | 0.500 | M | 0.25 | 0.25 | 0.20 | 0.40 | 0.40 | 1.0 |
| | | 2753 | Create Methodology Learning Products | Methods Fitness | 1 | 2.000 | 2.000 | 3.000 | M | 2.00 | 2.00 | 0.20 | 0.40 | 0.40 | 1.0 |
| | | 2757 | Train Capacity Modeling Team | Methods Fitness | 1 | 1.000 | 2.000 | 2.000 | M | 2.00 | 2.00 | 0.20 | 0.40 | 0.40 | 1.0 |
| | | | | | | | | | | | | | 64.70 |
| | 6220 | Develop Target Process Design | | | | | | | | | | | | 27.70 |
| | | 6221 | Identify Target Business Activities | Business Activities | 1 | 1.000 | 1.000 | 1.000 | M | 1.00 | 1.00 | 0.50 | 0.50 | | 1.0 |
| | | 6222 | Define Business Drivers | Business Procedure | 3 | 1.000 | 1.000 | 2.000 | C | 3.00 | 3.00 | 0.50 | 0.50 | | 1.0 |
| | | 6223 | Determine Business Workloads | Business Procedure | 3 | 1.000 | 2.000 | 3.000 | C | 9.00 | 9.00 | 0.50 | 0.50 | | 1.0 |
| | | 6224 | Establish Service Level Targets | Business Procedure | 3 | 1.000 | 2.000 | 3.000 | C | 9.00 | 9.00 | 0.50 | 0.50 | | 1.0 |
| | | 6227 | Develop Target User Team Training | Business Activities | 1 | 1.000 | 1.000 | 1.000 | M | 1.00 | 1.00 | 0.50 | 0.50 | | 1.0 |
| | | 6229 | Confirm Target Process Design | Test Dependent | 1 | 1.000 | 1.700 | 2.800 | M | 1.70 | 1.70 | 0.50 | 0.50 | | 1.0 |
| | 5520 | Build & Test Target Processes | | | | | | | | | | | | 37.00 |
| | | 5534 | Train Target User Team | Business Activities | 5 | 1.000 | 2.000 | 4.000 | M | 2.00 | 2.00 | 0.10 | 0.30 | 0.60 | 1.0 |
| | | 5552 | Complete Data Gathering Procedures | Business Procedure | 3 | 1.000 | 2.000 | 3.000 | C | 6.00 | 6.00 | 0.10 | 0.30 | 0.60 | 1.0 |
| | | 5553 | Develop Baseline Models | Business Activities | 1 | 3.000 | 6.000 | 9.000 | M | 6.00 | 6.00 | 0.10 | 0.30 | 0.60 | 1.0 |
| | | 5555 | Model Capacity Demand | Business Activities | 1 | 5.000 | 10.000 | 20.000 | M | 10.00 | 10.00 | 0.10 | 0.30 | 0.60 | 1.0 |
| | | 5557 | Prepare Capacity Planning Document | Business Activities | 1 | 5.000 | 10.000 | 20.000 | M | 10.00 | 10.00 | 0.10 | 0.30 | 0.60 | 1.0 |
| | | | | | | | | | | | | | 27.05 |
| | 7170 | Deploy Technology Infrastructure | | | | | | | | | | | | 27.60 |
| | | 7171 | Finalize Capacity Planning Binder | Business Activities | 1 | 2.000 | 4.000 | 6.000 | M | 4.00 | 5.00 | 0.20 | 0.40 | 0.40 | 1.0 |
| | | 7173 | Prepare & Present Management Report | Business Activities | 1 | 1.000 | 3.000 | 4.000 | M | 3.00 | 3.00 | 0.50 | 0.50 | | 1.0 |
| | | 7175 | Support Post-deployment Planning Cycle | Business Activities | 1 | 10.000 | 20.000 | 40.000 | M | 20.00 | 20.00 | 0.20 | 0.40 | 0.40 | 1.0 |

METHOD AND ESTIMATOR FOR PROVIDING CAPACACITY MODELING AND PLANNING

RELATED APPLICATIONS

This application claims the benefit of U.S. Provisional Patent Application Ser. No. 60/158,259, filed on Oct. 6, 1999. This application is related to U.S. Non-Provisional Patent Application Serial No. 09/685,162, entitled "Organization of Information Technology Functions," by Dove et al., Attorney Reference No. 10022/45, filed on the same day as this application. The above applications are incorporated by reference in their entirety.

BACKGROUND OF THE INVENTION

A major challenge in Information Technology ("IT") development is not the technologies, but rather the management of those technologies in a complex business environment. IT activities must be managed collectively and include idea conception, strategy development, capability delivery, planning, administration, operation, coordination of project requests, change administration, and managing demand for discretionary and non-discretionary activities and operations. The technological and business environment demands a shared understanding and representation of IT management. A technological management orientation needs ways to plan, assess, and deploy technology within and across enterprises. Business needs to balance technological capability with enterprise capability in order to become or stay a competitive organization.

Within an IT organization, there is a need to construct a complete yet simple IT framework that quickly conveys the entire scope of IT capability in a functional composition. The IT framework must be a single framework for describing IT management. The IT framework also needs to be a framework of all functions, representing a complete checklist of all relevant activities performed in an IT enterprise. A single IT Framework should represent all functions operative in an IT enterprise.

There also is a need for a capacity modeling and planning function to ensure appropriate system resources are available to handle the business workloads, to enable business capabilities, and to ensure target service levels are reached. By marketing current IT service offerings, increasing customer satisfaction, and building stronger customer relationships, the IT enterprise may provide better service to its business customer.

In addition, previous estimators of the capacity modeling and planning function gave only line cost figures and were directed to business rather than OM functions. It could take days or weeks before an IT consultant produced these figures for the client. If the project came in either above or below cost, there was no way of telling who or what was responsible.

As competition to provide IT services increases from outsourcers, capacity modeling and planning and a corresponding estimator are becoming more critical to the IT enterprise. To meet this competition, improved methods and estimators are needed for providing a capacity modeling and planning function for an IT framework.

BRIEF SUMMARY OF THE INVENTION

The present invention is defined by the following claims, and nothing in this section should be taken as a limitation on those claims. By way of introduction, one embodiment of the invention is a method for providing capacity modeling and planning that includes planning, designing, building, testing, and deploying a capacity modeling and planning function for an IT organization.

The planning step preferably includes developing a business performance model. The designing step preferably includes designing business processes, skills, and user interaction, and may also include designing an organization infrastructure, designing a performance enhancement infrastructure, and designing technology infrastructure and operations architecture.

In yet another aspect of the preferred embodiment, the building step preferably includes building the technology infrastructure, building the operations architecture, business policies, procedures, performance support, and developing learning products for the capacity modeling and planning.

In another aspect of the preferred embodiment, the testing step preferably includes testing the technology infrastructure, and testing the operations architecture for capacity modeling and planning.

In still another aspect of the preferred embodiment, the developing step includes deploying the technology infrastructure for the IT enterprise.

Another aspect of the present invention is a method for providing an estimate for building a capacity modeling and planning function in an information technology organization. This aspect of the present invention allows an IT consultant to give on site estimations to a client within minutes. The estimator produces a detailed break down of cost and time to complete a project by displaying the costs and time corresponding to each stage of a project along with each task. Another aspect of the present invention is a computer system for allocating time and computing cost for building a capacity modeling and planning function in an information technology organization.

These and other features and advantages of the invention will become apparent upon review of the following detailed description of the presently preferred embodiments of the invention, taken in conjunction with the appended drawings.

BRIEF DESCRIPTION OF SEVERAL VIEWS OF THE DRAWINGS

The present invention is illustrated by way of example and not limitation in the accompanying figures. In the figures, like reference numbers indicate identical or functionally similar elements.

FIG. 2 shows a representation of the tasks for selecting delivery options for the method represented in FIG. 1.

FIG. 3 shows a representation of the tasks for surveying packaged software candidates for the method represented in FIG. 1.

FIG. 6 shows a representation of the tasks for developing capacity modeling and planning methods design for the method represented FIG. 1.

FIG. 7 shows a representation of the tasks for designing capacity modeling and planning organization for the method represented in FIG. 1.

FIG. 8 shows a representation of the task for designing capacity modeling and planning performance enhancement for the method represented in FIG. 1.

FIGS. 13a and 13b show one embodiment of an estimating worksheet for an Operations Management Capacity Modeling and Planning Estimating Guide.

DETAILED DESCRIPTION OF THE INVENTION

Figure 1:
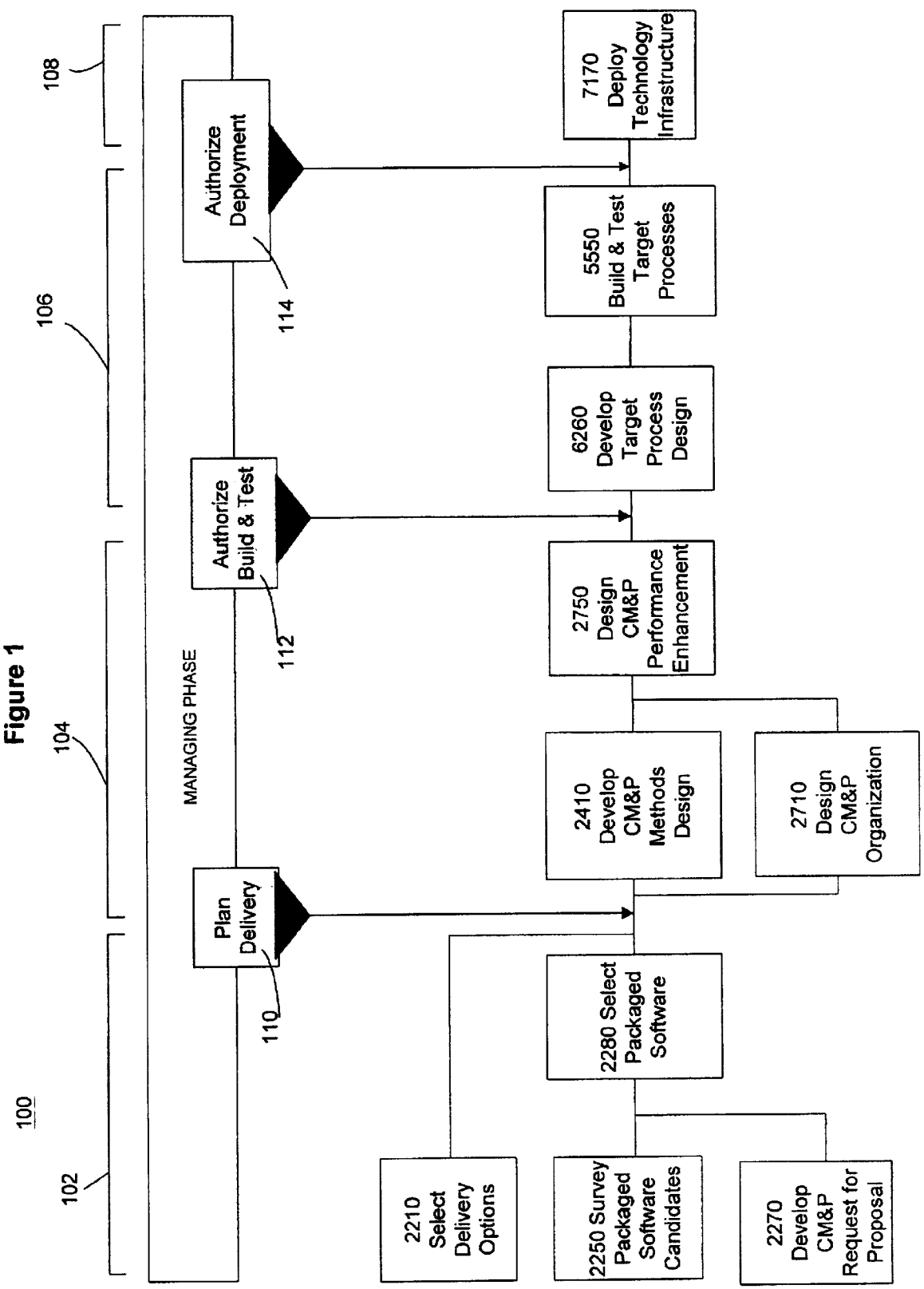
FIG. 1 shows a representation of the steps in a method for providing a capacity modeling and planning function according to the presently preferred embodiment of the invention.

For the purposes of this invention, an IT enterprise may be a business, charitable, government, another organization, and the like that uses an information technology system with or to support its activities. An IT organization is the group, associated systems, and processes within the enterprise that are responsible for the management and delivery of information technology services to users in the enterprise.

In an IT enterprise, multiple functions may be organized and categorized to provide comprehensive service to the user. The IT enterprise has an IT framework for understanding the interrelationships of the various functionalities and for managing a complex IT organization. The IT framework may include various operations management functionalities such as (1) a customer service management system function, (2) a service integration system, (3) a service delivery function, (4) a capability development function, (5) a change administration function, (6) a strategy, architecture, and planning function, (7) a management and administration function, (8) a human performance management function, and (9) a governance and strategic relationships function. Within the strategy, architecture, and planning function, capacity modeling and planning plays an important role. The invention is directed toward a method and estimator for providing a capacity modeling and planning function in an IT framework.

The strategy, architecture, and planning function creates a strategy and plan that outlines the overall IT capability direction, initiatives, and common IT processes, organizations, applications, and technology architecture required to support desired business capabilities with optimal efficiency. The strategy and plan are accomplished by working with the enterprise and business unit strategy teams and by analyzing technology industry trends. The strategy, architecture, and planning function provides technology guidance to the broader enterprise through the definition of common application and technology architecture blueprints.

These blueprints are integrated with the overall business architecture and with the definition of technology guiding principles and standards. The application and technology architecture blueprints include the IT organization, IT process architectures, application architectures, and delivery vehicle architectures (development, execution, operations and physical network, and computing environments) required to enable the business capabilities.

The strategy, architecture, and planning function aligns the IT enterprise with the business and increases the value, interoperability, and re-use of IT initiatives. Additionally, the strategy, architecture, and planning function evaluates, prioritizes, and plans for the recovery of critical business systems through a risk management function. The strategy, architecture, and planning function focuses on planning and balancing long-term, strategic initiatives with quick-win business opportunities. Day-to-day operational and administrative tasks are addressed within the service delivery and the management and administration functions.

The strategy, architecture, and planning function includes strategic planning, capability planning, and risk management. Strategic planning provides a long-term strategic direction for the IT enterprise and may be for a term of three to five years. Capability planning defines application and technology architectures and key business continuity and protection plans needed to deliver and enable the core business capabilities. Risk management encompasses functions aimed at identifying and securing enterprise assets against various forms of business interruption or loss.

Capability planning works with the strategic planning and quality management functions to ensure people and processes are in place to facilitate the interoperability of business capability IT solutions and to ensure consistent IT strategy implementation. Capability planning further ensures the technologies used by the enterprise also enable the pursuit of business objectives and capabilities. Capability planning also ensures the employment of sound operations and security practices.

Capability planning includes several functions or tasks such as process planning, organization planning, application architecture planning, data architecture planning, technology architecture planning, capacity modeling and planning, and architecture standards and compliance. Process planning defines the key IT processes and related performance requirements required to implement the overall IT function. Organization planning defines the organization required to support information technology processes. Application architecture planning defines applications, application requirements, the performance model, and application distribution approach needed to enable the business capabilities. Data architecture planning defines the data, data definitions, a performance model, and data distribution approach needed to enable the business capabilities. Technology architecture planning defines the technology architecture blueprints and performance model required to enable application blueprints to deliver business capabilities. Capacity modeling and planning ensures appropriate system resources are available to handle business workloads and enable business capabilities and that service level targets are reached. Architecture standards and compliance establishes the standards and guidelines for technology and architecture related items in the IT enterprise, including software, hardware, and configurations.

Capacity modeling and planning ensures appropriate system resources are available to handle the business workloads and enable business capabilities. The appropriate system may include computing, networking, and a combination or combinations. Capacity modeling and planning also ensures service level targets are reached. This function ensures enough physical facility is available to house resources and enough people are available to manage those resources.

Capacity modeling and planning may include a business definition and requirements planning task, a resource data gathering task, a capacity modeling task, a capacity plan development task, and a plan implementation and maintenance task. The business definition and requirement planning task defines key business requirements and business drivers to determine what IT resources are needed for a specific application during a given time frame.

The resource data gathering task collects key data for building a capacity model and performing capacity planning. The information for data gathering comes from a variety of sources, both manual and automated. Historical and current data are gathered to understand resource utilization trends, identify peak process periods, and plan for future processing demands. Accuracy is one of the most important aspects of data gathering. The accuracy of data directly impacts the accuracy of the capacity model and the quality of the capacity plan.

The capacity modeling task uses automated tools to build a model of the application and identify the system on which the application is running. The capacity modeling tool identifies the optimal hardware, software, and communications configuration needed to meet desired service levels for expected workloads.

The capacity plan development task summarizes the configuration strategies of the capacity modeling efforts and creates the capacity plan report. The capacity plan documents the capacity requirements and resource upgrades required for the coming year. The plan documents are used on an ongoing basis to track actual capacity consumption.

The capacity plan implementation and maintenance task presents the results of the capacity plan for a given planning period to management. Once approved, a capacity planning team works with other teams to execute the capacity plan. The team or function continually monitors the actual usage in the business environment and IT production environment. Business workload volumes, levels of performance, and resource utilization are monitored and compared against planned projections to determine variances. The results are reported on a periodic basis to management.

FIG. 1 is a representation of the task packages that may be included in one embodiment of a method for providing a capacity modeling and planning function. The task packages are shown in essentially a time sequence for a project having a managing phase and a delivery phase. However, the invention is not limited to carrying out these tasks in the particular sequence shown. The managing phase includes plan project evaluation, organize project resources, control project work, and complete project. The delivering phase includes capability analysis stage 102, a capability release design stage 104, a capability release build and test stage 106, and a deployment stage 108. The project may have milestones including plan delivery approval 110, authorization to build and test 112, and authorization for deployment 114.

The method for providing an operations management (OM) capacity modeling and planning function includes steps involved in building, but not running this particular OM function. These OM specific tasks are extensions of a business integration methodology, and provide additional detail to the steps required to build the OM specific function. The business integration methodology includes task packages covering analysis, design, build & test, and deployment. Each OM function is made up of process, organization, and technology elements that are addressed through the OM methods by appropriate task packages and tasks to create a comprehensive solution.

FIG. 2 is a representation of the task package to select delivery options 2210. This task package includes the following tasks: assemble standard capacity modeling and planning methods 2211, refine requirements 2213, create a strawman framework 2215, finalize delivery requirements 2217, and develop an overall capacity modeling and planning framework 2218. This task package defines the scope and direction of the development effort related to deployment of a capacity modeling and planning framework within an IT organization. The framework outlines the approach used for future workload forecasting efforts aimed at projecting capacity requirements.

The goal of this task package is to deliver a capacity management framework.

The major activities required for a capacity modeling and planning project may be summarized in the following steps:

(1) Define the overall capacity modeling and planning capability requirements, scope, and direction.

(2) Identify one or more modeling approaches to use.

(3) Select the appropriate modeling software components.

(4) Develop the workflows, procedures, and forms needed to create a capacity model.

(5) Identify the key business functions and business drivers for the target or pilot process to be modeled.

(6) Collect workload information and document the workload volumes to be modeled.

(7) Build and test the base model.

(8) Use the base model to project future utilization and develop a capacity plan.

Steps 1 through 4 are performed to establish the methodology and capabilities needed to develop and maintain capacity models. These steps may be completed only once for a given organization. Steps 5 through 8 are generally repeated for each key business activity until all activities are addressed and the organization has a complete set of models for its entire workload.

Delivery options are assessed to determine the types of modeling approaches and tools needed based on the size and complexity of the environment and the complexity of the applications. Alternatively, a modeling tool may be selected that fits the technology environment. The functions and capabilities of the tool then drive the design of modeling approaches to be employed.

Some commonly used modeling techniques include trend analysis, analytical modeling, simulation, and benchmarking. Trend analysis uses historical trends to predict future utilization. It is one of the simplest but normally is one of the least flexible and least accurate approaches. Analytical modeling uses mathematical techniques to model system capacity. It generally provides reasonable results and provides 'what-if' capabilities, but with somewhat more effort. The simulation approach models discrete events, frequently allows 'what-if' scenarios, and is most accurate for sizing new applications, although it can be very costly and time consuming. The benchmarking approach uses live data and resources to model the workload and develop projections. It is most accurate for comprehensive modeling. However, simulation usually requires an organization'sproduction system to be shutdown during the benchmark, which may not be acceptable.

The modeling environment may be simplified if the organization accepts a recommended modeling software and standard methodology. A "strawman" framework would require fairly limited modifications. However, considerable work effort may be needed to establish the environment if the organization requires modifications or selects another software option.

Net-centric considerations may affect the development of a capacity management framework. Issues such as global accessibility, 24×7 availability (available 24 hours per day, 7 days per week), unpredictability of users actions, and net-centric data types add unique considerations to capacity planning. These considerations may be technology-specific and not process-related. However, they may affect tools, processes, and scope of the capacity planning process.

"Net-centric" or "network centric" includes various means of reaching others (customers, clients, and the like) with computing systems over a communications structure, such as an intranet, extranet, or internet connection. The types of applications required by a net-centric computing system may be described by a framework. Application logic may be packaged into components and distributed from a server to a client over a network connection between the client and server. The client may have standardized interfaces. An application may execute with a client that can run on multiple operating systems and hardware platforms. Further, the application components of a net-centric computing system enable the net-centric computing systems to be adaptable to a variety of distribution styles, from a "thin client" to a "fat client."

Net-centric frameworks may support a style of computing where processes on different machines communicate using messages. In this style of computing, "client" processes delegate business functions or other tasks (such as data manipulation logic) to one or more server processes. Server processes respond to messages from clients. Business logic can reside on both the client and server. Clients typically are personal computers and workstations with a graphical user interface running a web browser. Servers may be implemented on UNIX, NT, or mainframe machines. In net-centric computing systems, there is a tendency to move more business logic to the servers. However, "fatter" clients often result from new technologies such as Java and ActiveX. In a net-centric environment, technology, people, and processes may be distributed across global boundaries. Business functions and systems may involve multiple organizations. This generally adds complexity to the systems.

Net-centric considerations include net centric data types, fat servers, thin clients, and push software distribution. Net-centric data types may increase from the introduction of net-centric technologies. Sites may contain images, audio and video clips, Java Applets or ActiveX controls, all of which must be part of traditional backup and restore plans and part of network capacity models. Storage and network capacity planning should allow for the increased size of these file types. Fat servers occur when file access is granted to the broader Internet community. Performance degradation becomes an issue as large numbers of users download files. This is also a consideration as servers deliver full-blown applications to networks of users. Frequent file transfers may cause performance bottlenecks within server hardware, server applications, network pipes, or client access interfaces. Proper capacity planning across all these components should be performed. In thin client net-centric environments, there is a greater reliance on the server for storage of personal files. This will increase capacity requirements for servers and networks and should be considered when performing capacity planning.

Push software distribution presents new considerations to capacity planning processes. For example, average capacity requirements may decrease with push architectures because users no longer waste bandwidth polling for new software or content updates. However, peak capacity requirements may increase because updates are simultaneously pushed to all subscribers when they become available.

FIG. 3 is a representation of the task package to survey packaged software candidates 2250. This task package includes the following tasks: assess the software market 2251, define software screening criteria 2252, and select software finalists 2253. This task package selects two or three packaged software vendors as finalists for detailed evaluation. The goals are to provide software selection criteria and to identify the potential vendors having the ability to satisfy key capacity planning requirements with their packaged software products.

If modeling software is required, the modeling approach selected dictates what the component options are. The modeling approach may be analytic, simulation, and benchmarking. Modeling tools include BEST/1, Snapshot, DEC Capacity Planner, WinRunner, LoadRunner, SES, and the like. Each modeling tool has unique features and characteristics. However, none of the modeling tools meets all the given sets of requirements and all environments. Also, the scope of the project, whether it be enterprise wide modeling or specific application performance analysis, dictates the options available. Considerable care should be used in identifying the most appropriate options for further analysis. In addition to analysis and modeling software, tools are also available which provide for the collection of data to be used in the modeling process.

The screening criteria used to select qualifying vendors are those key requirements that are critical to the organization and must be accommodated in the final solution. Vendors not satisfying these criteria need not be considered.

Figure 4:
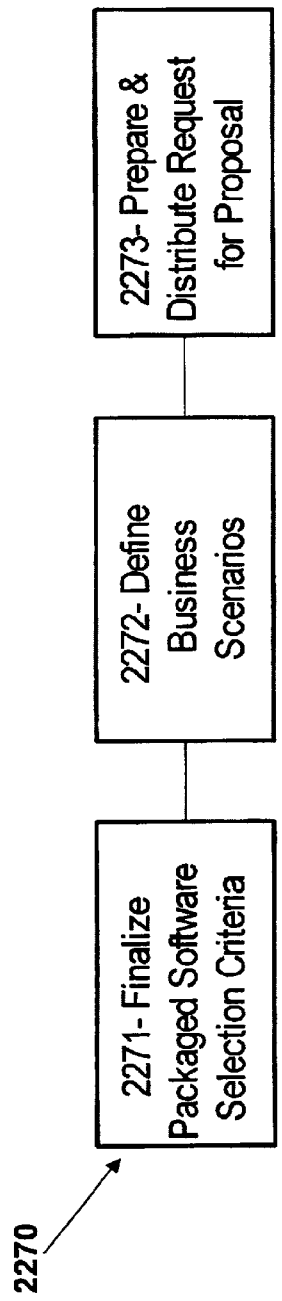
FIG. 4 shows a representation of the tasks for developing a capacity modeling and planning Request for Proposal for the method represented in FIG. 1.

FIG. 4 is a representation of the task package to develop a capacity modeling and planning request for proposal 2270. This task package includes the following tasks: finalize packaged software selection criteria 2271, define business scenarios 2272, and prepare and distribute a Request for Proposal ("RFP") 2273. This task package creates the RFP that is distributed to the packaged software finalists. The completed RFP is used to select the one or more software packages and one or more vendors. There may be more than one RFP. The goal is to provide the RFP.

The selection criteria in a distributed client and server environment are aimed at determining what resources are needed, where these resources are located, and what data transmission requirements are between the various locations. The resources may include CPU and memory for the host, clients, and servers, DASD and other storage, LAN and WAN communications, print, and the like. The analysis also considers batch processing separate from on-line processing, including the size of the batch processing window. In some environments, on-line processing may be required on a 24-hour basis, meaning the analysis must consider simultaneous on-line and batch processing, storage, and communications.

To successfully perform capacity modeling and planning, the approach and toolset employed typically must be capable of satisfying the following requirements, where M is a mandatory requirement and D is a desirable requirement.

Functional Requirements (1) Determine physical data processing volumes from business volumes (M).

(2) Determine processing requirements from on-line and batch application requirements (M).

(3) Model each resource in the infrastructure (D).

(4) Model for different ('What-if') scenarios of volume, functions, and hardware/software (D).

Data Requirements (5) Database definitions—DB name, number of records, record length, overhead (D).

(6) On-line processing volume data—DB calls per conversation, complexity, CPU usage, I/O usage, DBMS processing/navigation, network traffic (D).

(7) Batch processing volume information—number of jobs, complexity, CPU usage, I/O usage, network traffic (D).

Reporting Requirements (8) Report simulation results and predictions graphically (D).

(9) Report results in business terms using the agreed upon business drivers (M).

Business scenarios are a series of short narratives explaining critical packaged software requirements. The business scenarios focus on how a package works, as opposed to what features and functions it contains. Vendors respond to the scenarios by describing how their product meets the requirements. Business scenarios are used to differentiate the vendor's solutions based on functional fit, ease of use, and efficiency.

A Request for Proposal (RFP) may not be required if there are limited choices or time constraints, if there is no desire for a formal evaluation, or if the specifications are understood. If an RFP is required, every effort should be made to define requirements clearly and accurately so responses will be consistent and may be compared on a common basis. Vendors will invariably try to play up key features of their software. Accordingly, it is important to insist on strict adherence to the basic requirements format and the use of supplements or appendices to cover special features.

There are several network management considerations of the RFP. The capacity modeling and planning offerings of the network service provider should be reviewed. Some service providers may offer customer access to carrier databases and support facilities that provide an enterprise-wide view of the network. Options for capacity modeling and simulation of the network should be considered, especially if the client is short on resources or skills to perform and maintain the modeling solution and plan. When selecting a tool, consider the application architecture may impact the complexity of simulating network traffic. For example, Oracle databases may generate different traffic types depending on how the application is accessed (e.g., x-windows vs. client server vs. emulation). In the product selection, look for tools that use auto-discovery to facilitate creating the initial model of the network. Tools may also have a library of models from which one can be customized to resemble the actual environment. The trade-off between the level of network simulation and the usability of the tool should be considered. Packages that allow the user to drag-and-drop components in simulating the actual environment also should be considered. This feature facilitates recreating the technical environment in the tool. When customizing the capacity modeling tool, verify that network latency and queuing can be incorporated.

Figure 5:
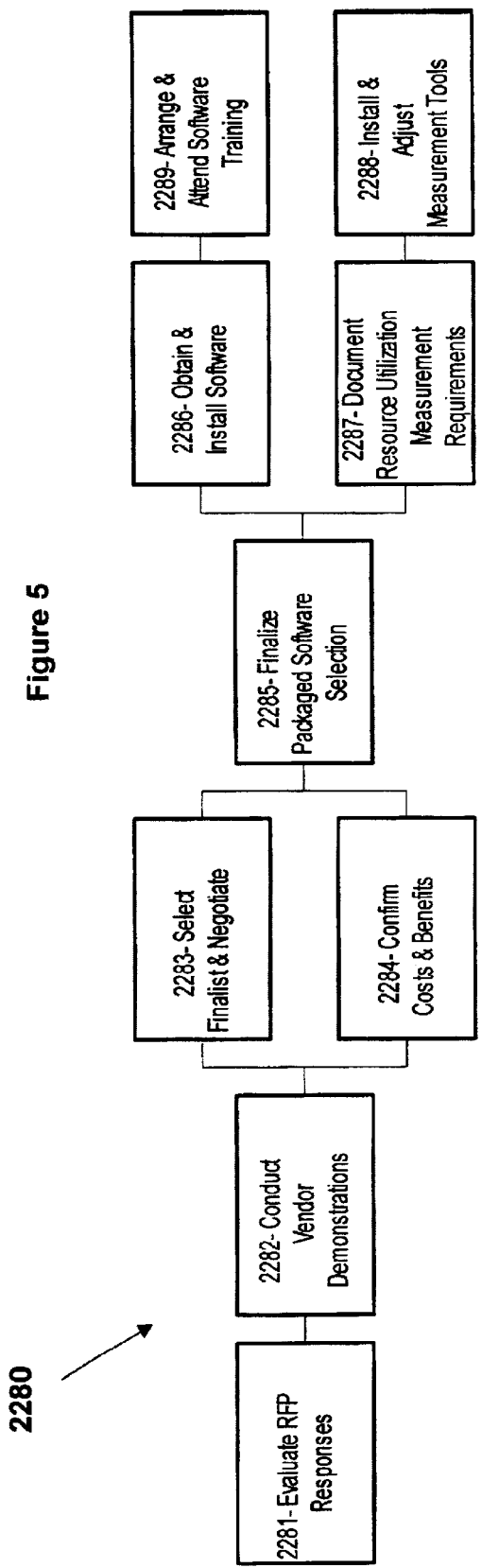
FIG. 5 shows a representation of the tasks for selecting packaged software for the method represented in FIG. 1.

FIG. 5 is a representation of the task package to select packaged software 2280 task package. This task package includes the following tasks: evaluate RFP responses 2281, conduct vendor demonstrations 2282, select finalist and negotiate 2283, confirm costs and benefits 2284, finalize packaged software selection 2285, obtain and install software 2286, document resource utilization measurement requirements 2287, arrange and attend software training 2289, and install and adjust measurement tools 2288. This task package gathers additional information about the packaged software finalists, allowing the evaluation and comparison of the capabilities and functionality of each finalist. After careful observation and analysis, a packaged software finalist is selected for each required component and contract terms are negotiated with the one or more vendor. The goal is to provide a packaged software selection and software training.

Site visits to other organizations using potential components are desirable to verify the vendor'sclaims of functionality and to obtain independent opinions about vendor support and cooperation. Objective rankings of options should be developed based on the importance of detailed functions and each component'sability to meet the functional requirements.

Procurement should be straight-forward. The major issue to be addressed may be cost. Many available products are reasonably expensive. Vendor training may be scheduled at any time during the project prior to the Build & Test Stage. The modeling software focuses on resource demands.

However, additional tools may be needed to get an accurate picture of the resource utilization imposed by the current workload. Again, this assessment must be reliable to project future resource requirements with any degree of accuracy.

FIG. 6 is a representation of the task package to develop capacity modeling and planning methods design 2410. This task package includes the following tasks: design process flows 2411, develop process descriptions 2412, prepare functional specifications 2413, design data gathering forms 2415, develop detailed flows, procedures, and forms 2417, customize software components 2418, and assemble capacity planning binder 2419. This task package designs capacity modeling and planning processes, functional specifications, and the forms needed for data collection and modeling. The goal is to provide capacity modeling methodology design elements and a capacity planning binder.

The development of methods is dependent on the acceptance of a "strawman" framework previously covered, as well as the choice of modeling software. In one aspect, the approach and documentation are based on the BEST/1 software suite. The approach and documentation includes data collection agents, analysis, and prediction tools. The approach and documentation may be based on other software. However, a decision to use other software or methods to support capacity planning may entail significant efforts to revise the documentation and standard processes.

In addition, environmental characteristics and the makeup of the workload may impact the approach to data collection and analysis. It is important to note that in client and server environments, where processing occurs at many nodes, the transmission of data resulting from that processing, commonly known as the Network Traffic, is the most difficult element to define and size. Traditional data processing applications, in which the application itself actually controls much of the data flow (e.g., number and size of screens required to enter a sales order or process an invoice), may be estimated with comparative ease. However, much of the network traffic in client and server environments is generated by newer applications that are under the control of the user. GroupWare applications, the most obvious one being electronic mail, fit this category. Here, a single user may create a fairly short word processing document, insert some screen images and other graphics, attach the document to an E-mail message, and send it to a mailing list. The mailing list may contain twenty to fifty names of people whose mail boxes may reside on a dozen or more different servers. Consequently, a single user may very innocuously create an unanticipated network traffic load of several hundred million bytes of information. One addressee responding to the message and copying all other addressees repeats the impact on the network. This type of activity is very difficult to estimate. It also is uncontrollable, because most users do not understand or are unconcerned about their impact on network traffic. This scenario may cause similar, although possibly less drastic impacts on disk storage requirements.

For applications with this type of activity, sometimes referred to as combination transactions, benchmarks may be built and tested for as many of the possible variations as is practical. It may also be possible to circumvent problem cases caused by this situation. Messages greater than a particular size may be intercepted and restricted to overnight delivery. The size may be 5 MB.

Capacity modeling and planning design involves analyzing the workloads and workload volumes and developing a modeling approach that best mirrors the production environment in order to produce reasonable projections. In many cases, this is not as simple as input-process-output. An example is where an on-line monitor is used for on-line activity and a DBMS handles the input and output. Here, it may be necessary to create a set of sub-models, or mini-models because the changes in business driver workload volumes affect each of the components differently. The set of sub-models or mini-models may include one for the monitor, one for the DBMS, and one for the application itself. This mini-model approach can be used to handle other similar situations as well.

Custom components for the capacity modeling and planning may be needed in the following scenarios:
  the organization requires customized reports (this may be necessary in the majority of cases) multiple tools are selected, and interfaces must be developed;
  there are essential requirements that cannot be satisfactorily met by either reuse or packaged software; and
  the decision is made to go with a manual or spreadsheet type of approach (this approach is generally of little value in today's complex environments).

Since custom design and development of software is time consuming and expensive, any such decision needs to be carefully evaluated.

Form and process design also may be more complex if the solution involves use of more than one tool for capacity modeling and planning. This may occur in large, complex environments where effective planning may produce significant hardware cost savings. This also may occur when the computing and networking components require different tools, which is very common in client and server environments. In these situations, the interfaces between the components must be verified and the overall high level design validated against technology requirements. Prototyping is not required. The capacity modeling and planning software is actually a prototyping tool in itself in many respects, rather than a complex architecture that may need to be simulated before proceeding.

There following net-centric considerations may be an issue when developing workflows, activities, and tasks for capacity planning in a net-centric environment:
  (1) Extranet Partners—workflows, activities, and tasks (i.e., initial interviews, data collection from systems) may span multiple organizations for capacity planning;
  (2) More Frequent Activities—capacity planning activities (i.e., update processes, communication processes, reporting processes) may occur more frequently due to the dynamic and unpredictable nature of the Internet; and
  (3) New Events—in a net-centric environment, new events such as push/pull software distribution and content management may influence capacity planning (these new events should be properly integrated into capacity planning processes to ensure they will not have adverse effects on the system).

There are several network management considerations. Most robust network capacity modeling requires significant time and effort during configuration and customization to accurately simulate the environment. Consider what procedures should be developed that will facilitate the maintenance of the network capacity model. Consider the capacity modeling tool'sability to integrate with other network components and network management systems. This will facilitate the collection and input of network information. Ensure that the collection of network baseline traffic data can be integrated into the modeling tools to simulate the actual environment. Verify that the data adequately represents a sufficient period of time to understand data peaks. Identify the bottlenecks in the network that impact the scalability of the network (bridges, routers, hubs, etc.). Consider how network modeling will interface with other management functions (monitoring, performance tuning etc.). Consider practical capacity limits for throughput vs. theoretical limits for LAN and WAN capacity.

FIG. 7 is a representation of the task package to design capacity modeling and planning organization 2710. This task package includes the following tasks: design capacity modeling and planning roles 2711 and document roles and responsibilities 2713. This task package defines what is expected of people who participate in the capacity modeling and planning function, the required competencies for people to perform the function, and how their performance is managed and sustained. The goal is to provide capacity modeling and planning roles and responsibilities.

In this task package, required skills are identified and grouped by workflow processes into the key capacity modeling and planning roles. These roles would normally include overall management of the function, execution of the modeling software, analysis and interpretation of results, and activity reporting and communication.

The key jobs normally involved in on-going modeling and monitoring activities include the Capacity Planner, or Planning Manager, and the Planning Analyst. The latter may be individuals or teams, depending on the size of the organization and scope of responsibilities. The role of the capacity planning function is to maintain overall control of the modeling tools and the capacity modeling and planning process. This would include on-going scheduling and execution of capacity modeling and planning activities, control of reporting and monitoring functions, and communicating with IT management regarding capacity issues and problems. The role of the Planning Analyst is to assist application development personnel with capacity modeling and planning issues as new applications or maintenance enhancements are designed, coded, tested, and deployed.

Personnel with responsibility for on-going capacity modeling and planning activity need a combination of business management and technology skills. Technology skills include in-depth knowledge of:
  capacity planning and modeling concepts and techniques;
  elements making up the environment (Servers, Clients, DASD, communications, etc.);
  all modeling tools used, and the configuration of the tools at all sites;
  performance management software in use, and performance reporting;
  the capacity modeling and planning process and the SLA'sin place; and
  business capability requirements and how they translate to application requirements and then into technology infrastructure processing volumes and system utilization.

In addition to technology skills, capacity modeling and planning personnel need common business administration and business management skills, such as the ability to read and interpret the performance reports, analyze and evaluate trends, work effectively with others involved in the process, document problems and issues for resolution, and communicate ideas and recommendations to senior IT and enterprise management. Organizational infrastructure considerations are typically minimal when introducing a capacity modeling and planning function because of the small size and specialized skills of the group.

There are several net-centric considerations when developing capacity modeling and planning methods designs. Skills needed to perform the capacity planning function in a net-centric environment include:
- knowledge of net-centric computing and its impact on capacity planning; and
- network centric performance and mass storage management considerations.

Additional considerations for designing roles, jobs, and teams for Capacity Planning in a net-centric environment include:
(1) extranet partners—capacity planning teams may span multiple organizations; and
(2) impact on staffing and forecasting models—given potential changes in incident frequencies, volumes, interaction methods, and the times they are reported, net-centric service providers, support personnel, and help desks should readdress support team staffing and forecasting models to ensure that customers are receiving the proper level of support.

New interaction methods and the large number of potential users may challenge existing capacity planning models.

There are network management considerations when developing capacity modeling and planning methods designs. The network service provider may be included on the capacity modeling and planning team. The service provider may often provide tools and experience that can assist in development and maintenance of the physical network plan.

FIG. 8 is a representation of the task package to design capacity modeling and planning performance enhancement 2750. This task package includes the following tasks: define learning approach 2751, develop methodology learning products 2752, and train the capacity modeling team 2757. This task package determines the training needed for the new capacity modeling and planning function, as well as the online help text, procedures, job aids, and other information to be used during actual work. The goal is to provide capacity modeling and planning methods training.

Performance enhancement design for capacity modeling and planning may be minimal for the technical modeling and planning staff. Training may almost always be most economical when purchased from the vendors supplying the modeling software, or from other outside firms specializing in this type of training. The same is true for the systems software skills that are needed. For application knowledge, capacity modeling and planning staff will normally receive on-thejob training from application development or maintenance personnel when assigned to a given project. Likewise, desktop aids and other performance support are typically not applicable, as this is a highly analytical function that does not lend itself to quick-reference lookups.

The primary training required, therefore, is focused on the methodology used to collect data and develop capacity models for business activities and applications.

There are network considerations for design capacity modeling and planning performance enhancement. Network modeling tools typically require significant training to understand the complexities of the tool. Often, vendors offer hands-on workshops with their products. Ensure that there is client buy-in and ownership due to the significant training investment required to operate and maintain modeling tools.

Figure 9:
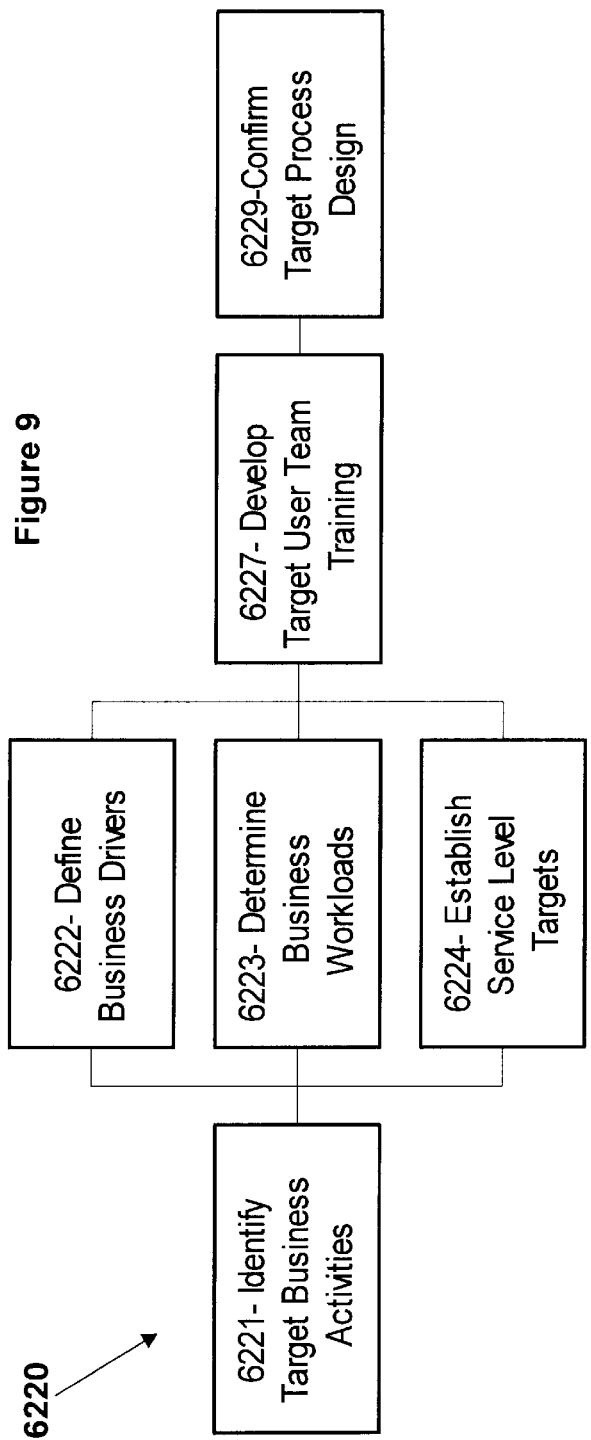
FIG. 9 shows a representation of the tasks for developing a target process design for the method represented in FIG. 1.

FIG. 9 is a representation of the task package to develop target process design 6260. This task package includes the following tasks: identify target business activities 6221, define business driver 6222, determine business workloads 6223, establish service level targets 6224, develop target user team training 6227, and confirm target process design 6229. This task package creates the detailed framework for the specific business activities to be modeled. The development of the actual plan document may begin at this point. The goal is to provide capacity planning policies & procedures and capacity plan component drafts.

Once the capacity modeling and planning methodology and software are in place, the actual modeling process begins with establishing and agreeing on the overall scope and objectives and the key business functions to be included in the "target" or "pilot" project, the business units involved, and key users and responsibilities within the business unit. It is desirable to express the key functions in business terms rather than system terms. This facilitates communication with the user community and prepares for identification of business drivers using similar terminology. Linking functions with business units and users sets the stage for forecasting, which occurs in subsequent tasks.

Once scope is determined, the business drivers are defined for all functions. The business drivers are the keys to projecting and reporting future growth in utilization. Some typical drivers might include:
- the number of customers for order entry applications;
- the number and growth in personnel for human resource systems; and
- the number of programmers for systems development or application maintenance.

These drivers are factors used in the modeling process to project capacity requirements. They also may be used in on-going reporting to management. The purpose of this is to relate capacity needs to business factors that may be easily understood and analyzed. The drivers need to be validated to confirm they are good predictors of processing workloads.

Target process design also involves determining business workloads. A workload is defined as the transactions performed by a user and the transactions performed by the supporting application(s) to accomplish a business function. Workloads are a key link in translating business function and business driver volume into actual system resource utilization. Accurate and complete mapping of workloads is essential to the modeling and planning process. It can be very time consuming, and typically requires extensive support from users, application developers, and even hardware/software vendors.

Capacity modeling and planning may be undertaken to ensure that service levels can be met at the lowest reasonable cost. An understanding of what service levels are included in the scope is critical. The impact of service levels on performance, and therefore on capacity, may be felt in many ways. In many environments, some form of the 80/20 rule applies—20% of the applications or transactions generate 80% of the workload volume. Here, it may be appropriate to focus solely on that 20% as being sufficient for modeling. In addition, the severity of penalties for failure to meet SL's(or rewards for over-achievement) influences the portions of the workload to be modeled. This may also influence desired capacity and utilization levels of the production environment (e.g., a 'no down-time' requirement may dictate close to 100% redundancy in the hardware configuration).

Other capability requirements could include definition of the planning horizon to be addressed, an assessment of current capabilities (i.e., operational problems, ability to meet current/projected service levels), planned growth of current and future applications, constraints on present and future hardware such as anticipated lead times for procurement, and the complexity of the environment relative to what modeling approaches may be appropriate.

Plans for changes in hardware/software configurations will also impact capacity planning and need to be documented and assessed.

There are net-centric considerations when developing target process design. Areas such as global presence, 24×7 availability, unpredictability of users' actions, and net-centric data types will add unique considerations to capacity planning. Though these considerations are more technology- than process-related, they are important to consider as they can affect tools, processes, and scope of the capacity planning process.

Net-Centric considerations are outlined below:

(1) Users, ubiquity, and 24×7 availability—Because of the anonymous and global nature of the Internet, capacity planning for net-centric technologies may need to consider unpredictable usage trends. It is also important to note that in a net-centric environment the capacity plan may need to be changed, reviewed, and reported on more frequently due to net-centric'sunpredictability.

(2) Net-Centric Service Providers and Service Control—Given potential changes in incident frequencies, volumes, interaction methods, and the times they are reported, net-centric service providers and Service Control should readdress support team staffing and forecasting models to ensure that customers are receiving the proper level of support. New interaction methods and the large number of potential users may challenge existing capacity planning models.

(3) Content Management- Changes in content can lead to drastic and sudden changes in usage. Site planners should be prepared for these events and ensure proper requirements are put in place to support the Capacity Planning function.

There are network management considerations when developing target process design. Consider the processes that will be necessary to determine network bottlenecks, predict future performance requirements, perform failure and "what-if" analysis with the capacity modeling tool. Determine what capacity modeling and planning processes will be performed centrally vs. distributed over the network. Consider how frequently network capacity modeling and planning will occur and how it will be maintained. Ensure that the purpose of network modeling is clear to all stakeholders (confirmation of the application architecture vs. network bandwidth vs. support of Service Level targets.)

Figure 10:
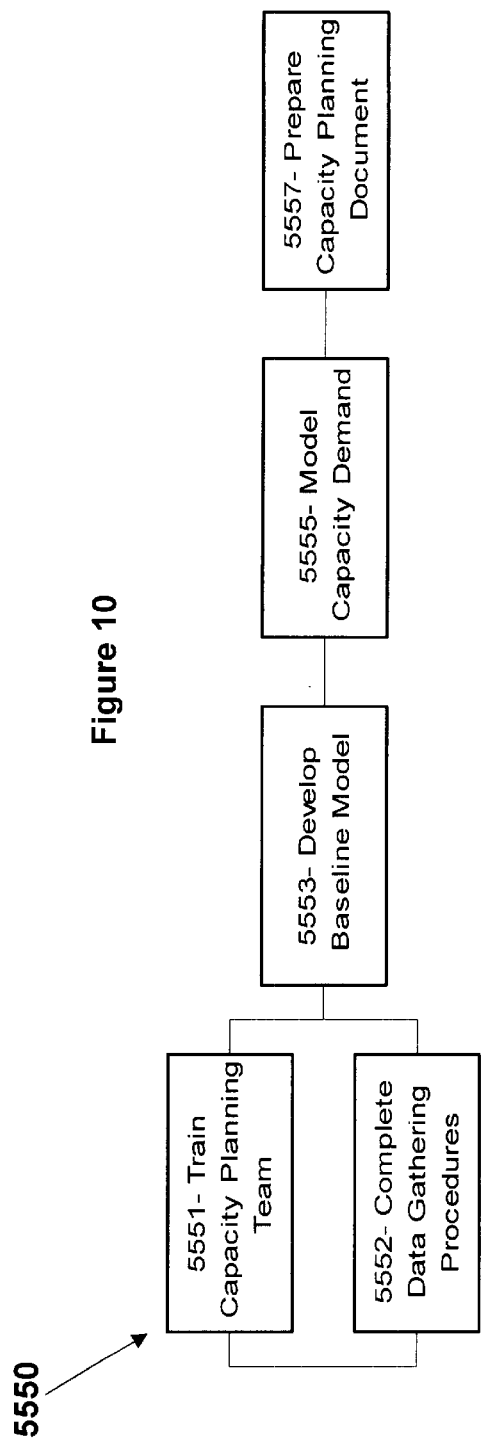
FIG. 10 shows a representation of the tasks for building and testing target processes for the method represented in FIG. 1.

FIG. 10 is a representation of the task package to build and test target processes 5550. This task package includes the following tasks: train capacity planning team 5551, complete data gathering procedures 5552, develop baseline model 5553, model capacity demand 5555, and prepare capacity planning document 5557. This task package designs and programs the capacity modeling & planning components that make up the base models, including extensions to reused and packaged items, and then to perform the workload characterization, model calibration, and verification. Multiple iterations of this task package may be required to align all components. The goal is to provide capacity models and a capacity management plan.

Training for users involved in the forecasting process may be appropriate, but this will typically be a small group of people and forecasting will represent only a minor portion of their workload. Also, the training they need is mainly forms-filling—knowledge needed to prepare the periodic estimates comes from business knowledge and experience, not from capacity modeling and planning training. Forms training can typically be done in hands-on classroom sessions requiring only minimal preparation.

Data gathering involves the collection of data to be input to the modeling process. With respect to business functions, or transaction workloads, there are two basic categories of data used:

(1) Actual data volumes—current and historical volumes of transactions which reflect the levels of business activity now being processed. Historic data may be of value in reviewing trends, in cases where these trends are expected to continue into the future.

(2) User Forecasts of projected data volumes—estimates of future business activity. These typically would be developed by key business users and are based on procedures defined by the capacity modeling and planning project team. The recommended approach is to forecast the changes to key business drivers for each function, and then translate these into changes expected in workload volumes. Forecasts may be projected for any time period and may depend on specific requirements of the sponsoring organization. A common method is to develop an initial 12-month forecast, and then update it each quarter with an additional 3 month projection based on actual and expected results. This may be referred to as a rolling 12-month forecasting process.

Application development and maintenance workloads may need to be factored in along with production workloads if they comprise a significant portion of total utilization.

In addition to the data to be processed, the processing environment must be documented. This includes the present hardware/software specifications, current system utilization, current system performance metrics, and any limitations and constraints inherent in the environment. Utilization data for on-line activities must recognize and account for peaking during the normal on-line day, and capacity plans must typically be based on peak requirements rather than average requirements.

The workload characterization process consists of taking the business functions and application business drivers and decomposing them into system transactions. The transactions that relate to a given business driver are grouped together to create a workload. The resources that are consumed by each transaction are accumulated to determine the resource usage for the total workload.

In a client and server environment, transactions may not be as easy to isolate as in a mainframe environment. A transaction usually must be created by grouping the processes or threads and is initiated by the occurrence of a business driver event. The processes and threads that consume the majority of the resources are the ones that should be included in the transaction. For example, a user in the client server environment might initiate a series of processes on a client machine, one of which is a request for customer credit information. This request is sent to a server in the form of a query. The activity performed to satisfy the query represents the processing performed. Capturing activity by process and grouping the processes permits identification, and subsequently analysis, of resource utilization by 'transaction,' and thereby relates utilization back to business drivers.

Resource utilization data is normally gathered by Collection Agents. These Agents are simply programs that reside in servers and capture process activity for specified time periods. This data is then passed to the analysis modules of the modeling software to create the base models.

As previously noted, data for base models should be collected during peak periods of random or on-line processing activity for target applications. For applications not yet in production environments, base model data must be generated through manual input, benchmarking, or some other technique.

Once the base model has been created, it must be calibrated in order to ensure that the model is a true representation of the actual system. Calibration involves verifying that the model's projections accurately reflect business conditions, then adjusting the assumptions and parameters used to correct any problems.

Once the base model has been tested, calibrated, and approved, the model's utilization projections are analyzed and resource configuration alternatives that satisfy the capacity requirements are developed. The on-going capacity modeling and planning team as well as the key business users who will be involved in capacity planning in the future should be heavily involved in executing the product test. The cost of each viable alternative is determined. The benefits are documented. The most desirable configuration strategy is presented to the management of the organization for review and approval.

The capacity plan should also be completed in conjunction with this task package. The development of the capacity plan includes:

summarization of configuration strategies;
collection of cost data for alternative configurations;
analyses of costs and benefits for alternatives;
policies and procedures for modeling and capacity management; and creation of a Capacity Planning Project Report.

The plan should cover the scope and objectives of the project, results realized as outlined above, procedures for on-going execution, procedures for maintenance of the planning process, and other issues that may be significant to the sponsoring organization. The plan typically defines the resource requirements by type, and estimates changes in the requirements, either up or down, over a period of time. A plan may be based on six-month increments, showing the projected capacity requirements by resource type for each six month period over a total time frame of three to five years. It may be appropriate to recommend firm follow-up if the capacity modeling and planning process is new to the organization. On-going management attention to the plan should also be arranged to ensure the project is not treated as just a one-time exercise and then discarded.

There are several network management considerations to develop build and test target processes. Consider limiting the model to a particular segment or application type so as to prove the model prior to creating more complex scenarios. Schedule significant time with the vendor to be on premises during this phase to ensure the model is mirroring the actual environment.

Figure 11:
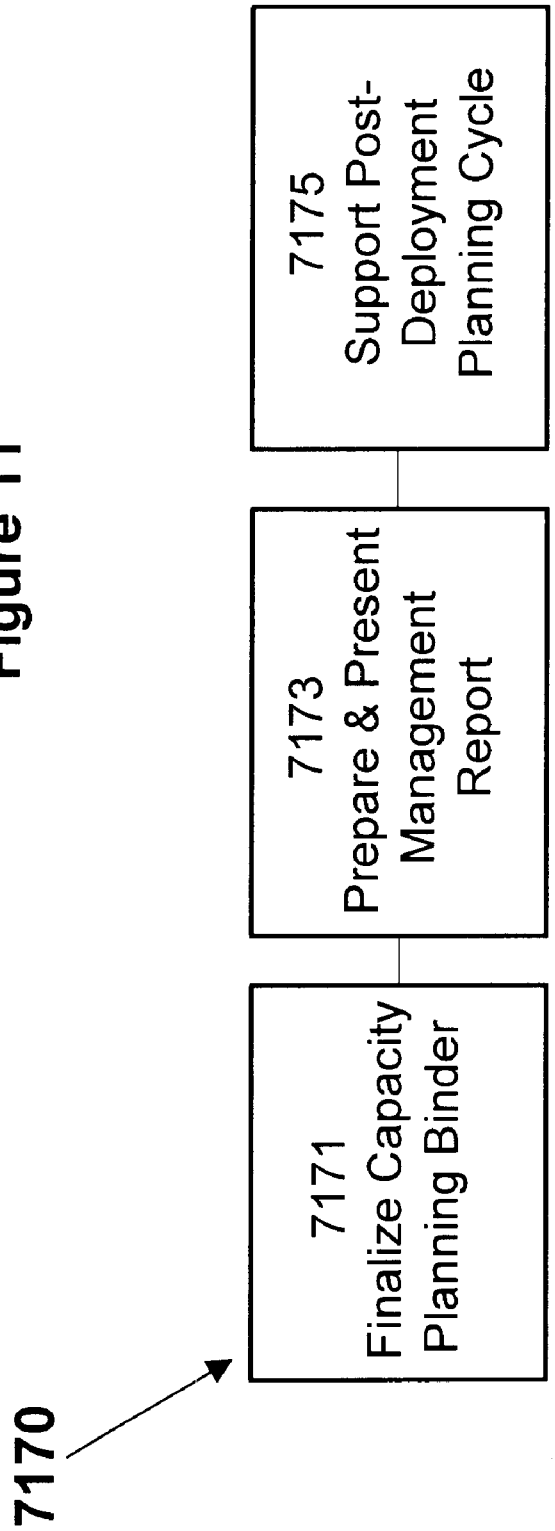
FIG. 11 shows a representation of the tasks for deploying technology infrastructure for the method represented in FIG. 1.

FIG. 11 is a representation of the task package to deploy technology infrastructure 7170. This task package includes the following tasks: finalize capacity planning binder 7171, prepare and present management report 7173, and support post-deployment planning cycle 7175. The capacity modeling and planning infrastructure is implemented within the deployment unit. The capacity plan is finalized and published. The policies and procedures are activated for on-going forecasting, data collection, and reporting. The goal is to provide a capacity plan and a capacity modeling and planning infrastructure.

After the capacity modeling and planning capability is deployed, the model should be run on a periodic basis as additional production data and new user forecasts are collected and entered into the database. This will verify that the model is still forecasting utilization and capacity needs correctly, or will indicate that changes are required. The model developed through this process should be a reliable tool to support the on-going performance management, modeling, & planning processes.

Estimator

In addition to the method for providing the capacity modeling and planning function as described above, the invention provides a method and apparatus for providing an estimate for building a capacity modeling and planning function in an information technology organization. The method and apparatus generate a preliminary work estimate (time by task) and financial estimate (dollars by classification) based on input of a set of estimating factors that identify the scope and difficulty of key aspects to the system.

Figure 12:
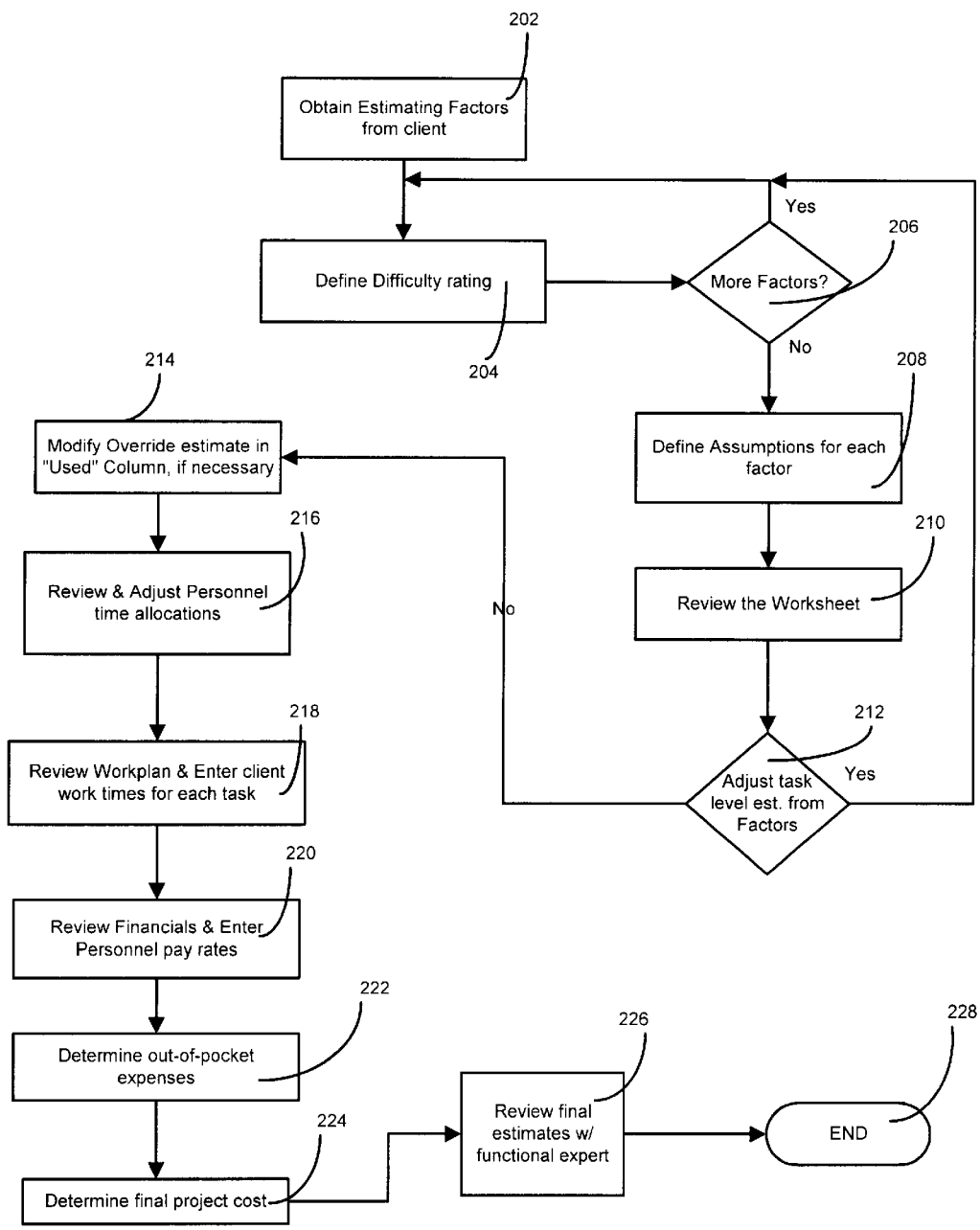
FIG. 12 shows a flow chart for obtaining an estimate of cost and time allocation for a project.

FIG. 12 is a flow chart of one embodiment a method 200 for providing an estimate of the time and cost to build a capacity modeling and planning in an information technology organization. In FIG. 12, a provider of a capacity modeling and planning, such as an IT consultant (e.g., Andersen Consulting) obtains estimating factors from the client 202. This is a combined effort with the provider adding expertise and knowledge to help in determining the quantity and difficulty of each factor. Estimating factors represent key business drivers for a given operations management OM function. Table 1 lists and defines the factors to be considered along with examples of a quantity and difficulty rating for each factor.

TABLE 1

| Estimating Factor | Number | Difficulty | Definition |
|---|---|---|---|
| Business Activities | 0 | | Number of business activities to be included in modeling effort; normally 1 activity is selected for a pilot/target. |
| Business Procedures | 0 | | Number of business procedures within the business activity(ies) to be modeled |
| Capacity Modeling and Planning Roles | 0 | | Number of roles in the proposed capacity modeling and planning organization to be designed and documented; 0 if already documented |
| Methods Fitness | 0 | | Degree to which the sponsoring organization accepts standard AC capacity modeling and planning methodology and modeling software tools. 0 = Methods previously installed, 1 = Methods to be installed in this project. |
| Metrics Servers | 0 | | Number of servers on which measurement software is to be installed. |
| New Team Members | 0 | M | Number of AC team members requiring modeling software training |
| Other Training Days | 0 | M | Total number of additional AC team training days |
| Software Components | 0 | | Number of modeling software components to be procured and used |
| Software Selection | 0 | | Number of components to be evaluated/selected in cases where sponsoring organization does not accept recommended AC modeling software tools |

TABLE 1-continued

| Estimating Factor | Number | Difficulty | Definition |
|---|---|---|---|
| Task Dependent | 1 | | Effort is calculated as a % of the effort required to complete other tasks |

As an illustration of the method of the invention, the provider, with the help of the client, determines an estimating factor 202, such as for the number of business procedures. The determination of the difficulty rating is determined 204. Each of these determinations depends on the previous experience of the consultant. The provider or consultant with a high level of experience will have a greater opportunity to determine the correct number and difficulty. The number and difficulty rating are input into a computer program. In the preferred embodiment, the computer program is a spreadsheet, such as EXCEL, by Microsoft Corp. of Redmond, Washington, USA. The consultant and the client continue determining the number and difficulty rating for each of the remaining estimating factors 206.

After the difficulty rating has been determined for all of the estimating factors, this information is transferred to an assumption sheet 208. The assumptions for each factor are defined. The assumption sheet 208 allows the consultant to enter comments relating to each estimating factor, and to document the underlying reasoning for a specific estimating factor.

Next, an estimating worksheet is generated and reviewed 210 by the consultant, client, or both. An example of a worksheet is shown in FIGS. 13a and 13b. The default estimates of the time required for each task populate the worksheet with time estimates based on the number factors and difficulty rating previously assigned to the estimating factors that correspond to each task. The amount of time per task is based on a predetermined time per unit required for the estimating factor multiplied by a factor corresponding to the level of difficulty. Each task listed on the worksheet is described above in connection with details of the method for providing the capacity modeling and planning function. The same numbers in the description of the method above correspond to the same steps, tasks, and task packages of activities shown on the worksheet of FIGS. 13a and 13b. The worksheet is reviewed 210 by the provider and the client for accuracy. Adjustments may be made to task level estimates by both returning to the factors sheet and adjusting the units 212 or by entering an override estimate in the 'Used' column 214 on the worksheet. This override may be used when the estimating factor produces a task estimate that is not appropriate for the task, for example, when a task is not required on a particular project.

Next, the provider and the client review and adjust, if necessary, the personnel time staffing factors for allocations 216 for the seniority levels of personnel needed for the project. Referring to FIGS. 13a and 13b, these columns are designated as Partner—"Ptnr", Manager—"Mgr", Consultant—"Cnslt", and Analyst—"Anlst", respectively. These allocations are adjusted to meet project requirements and are typically based on experience with delivering various stages of a project. The staffing factors should add up to 1.

The consultant or provider and the client now review the workplan 218, and optionally may include labor to be provided by the client. In one embodiment, the workplan contains the total time required in days per stage and per task required to complete the project. Tasks may be aggregated into a "task package" of subtasks or activities for convenience. A worksheet, as shown in FIGS. 13a and 13b may be used, also for convenience. This worksheet may be used to adjust tasks or times as desired, from the experience of the provider, the customer, or both.

Finally, a financial estimate is generated in which the provider and 10 client enter the agreed upon billing rates for Ptnr, Mgr, Cnslt, and Anlst 220. The total estimated payroll cost for the project is then computed and displayed, generating final estimates. At this point, a determination of out-of-pocket expenses 222 may be applied to the final estimates to determine a final project cost 224. Preferably, the provider reviews the final estimates with an internal functional expert 226.

Other costs may also be added to the project, such as hardware and software purchase costs, project management costs, and the like. Typically, project management costs for managing the providers work are included in the estimator. These are task dependant and may run between 10 and 15% of the tasks being managed, depending on the level of difficulty. These management allocations may appear on the worksheet and work plan. The time allocations for planning and managing a project are typically broken down for each of a plurality of task packages where the task packages are planning project execution 920, organizing project resources 940, controlling project work 960, and completing project 990, as shown in FIG. 13a.

It will be appreciated that a wide range of changes and modifications to the method as described are contemplated. Accordingly, while preferred embodiments have been shown and described in detail by way of examples, further modifications and embodiments are possible without departing from the scope of the invention as defined by the examples set forth. It is therefore intended that the invention be defined by the appended claims and all legal equivalents.

What is claimed is:

1. A method for providing an estimate for building a capacity modeling and planning function in an information technology organization, the method comprising:
   obtaining a plurality of estimating factors;
   determining a difficulty rating for each of said estimating factors;
   generating a time allocation for building said capacity modeling and planning based on said estimating factor and said difficulty rating; and
   generating a cost for building said capacity modeling and planning based on said time allocation.

2. The method as recited in claim 1, wherein obtaining said estimating factor further includes receiving said estimating factors from a client.

3. The method as recited in claim 1, wherein said estimating factors include the number of at least one of business activities, business procedures, capacity modeling and planning roles, methods fitness, metrics servers, new team members, other training days, software components, and software selection.

4. The method as recited in claim 1, wherein said difficulty rating is selected from the group of simple, moderate, or complex.

5. The method as recited in claim 1, wherein said time allocation includes time allocated for a plurality of individual team members where said individual team members include at least one of partner, manager, consultant, and analyst.

6. The method as recited in claim 1, wherein said cost depends on said time allocation and a billing rate for said individual team member.

7. The method as recited in claim 1, wherein said cost is broken down for each of a plurality of stages for building said capacity modeling and planning where said stages include at least one of a plan and manage stage, a capability analysis stage a capability release design stage, a capability release build and test stages, and a deployment stage.

8. The method as recited in claim 1, wherein said time allocation is used to generate a project work plan.

9. The method as recited in claim 8, wherein said work plan is broken down for each of a plurality of stages for building said capacity modeling and planning where said stages are a plan and manage stage, a capability analysis stage, a capability release design stage, a capability release build and test stages, and a deployment stage.

10. The method as recited in claim 9, wherein said plan and manage stage is broken down for each of a plurality of task packages where said task packages are plan project execution, organize project resources, control project work, and complete project.

11. The method as recited in claim 1, wherein said billing rate is used to generate a financial summary of said cost.

12. A computer system for allocating time and computing cost for building a capacity modeling and planning function in an information technology system, comprising:

a processor;

a software program for receiving a plurality of estimating factors and difficulty rating for each of said estimating factors and generating a time allocation and cost for building said capacity modeling and planning; and a memory that stores said time allocation and cost under control of said processor.

* * * * *